Patented Nov. 11, 1930

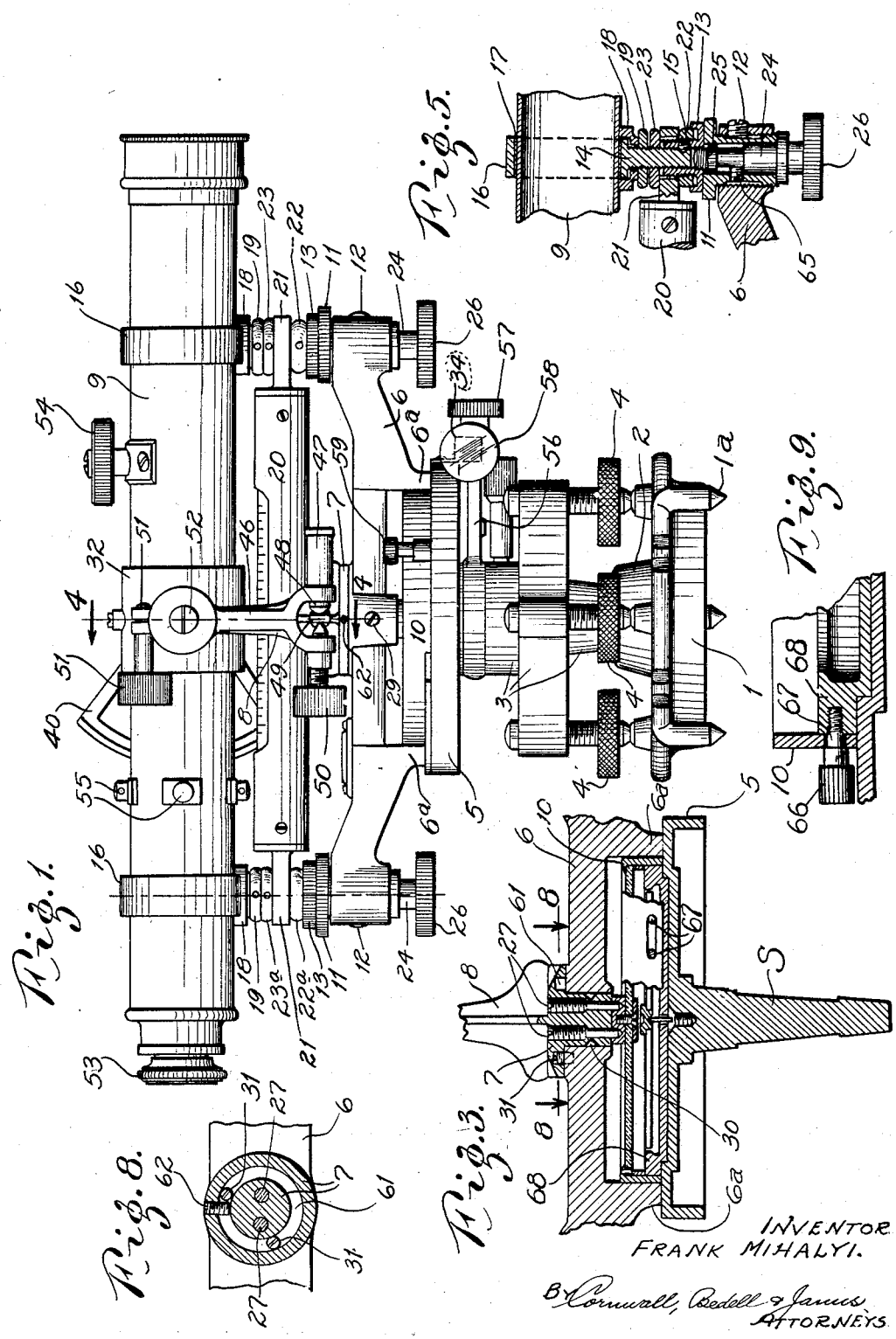

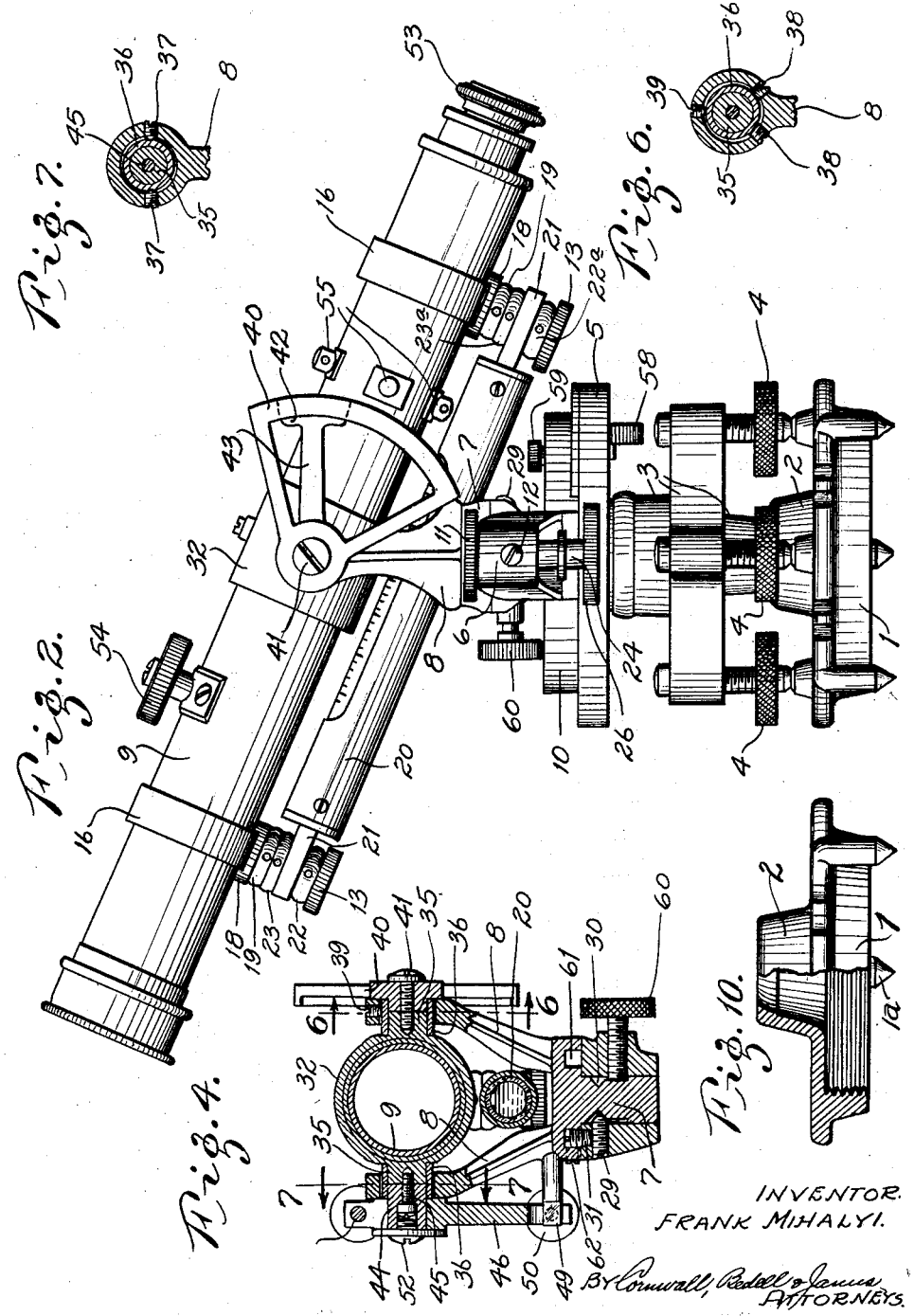

1,781,666

UNITED STATES PATENT OFFICE

FRANK MIHALYI, OF ST. LOUIS, MISSOURI, ASSIGNOR TO THE DAVID WHITE COMPANY, OF MILWAUKEE, WISCONSIN, A CORPORATION OF WISCONSIN

TRANSIT LEVEL

Application filed December 6, 1926. Serial No. 153,010.

My invention relates to surveying instruments and consists in an improved transit-level.

The general object of my invention is to provide a single instrument which may be used as an ordinary level or may be used as an ordinary transit without separating any of the parts from each other.

There are a number of more specific objects of my invention, one of which is to provide an improved structure for mounting a spirit level and a telescope in assembled position with each other in such manner as to avoid mounting the spirit level on the telescope barrel and to permit adjustment of the telescope and spirit level independently of each other.

I also desire to provide for axial rotation of the telescope for centering adjustment of the telescope cross wires without affecting the mounting of the spirit level associated with the telescope.

Another object is to provide cooperating elevation arc elements in an instrument adapted to be used as a transit or a level.

Another object is to provide permanent bearings for transverse journals on the telescope, which bearings preferably are adjustable vertically relative to each other.

I also desire to mount the telescope in its transverse bearings so that, if necessary, it can be removed as a unit without removing any bearing caps or other parts likely to be reversed, or otherwise affect the accuracy of the bearings, in replacing the telescope in its transverse bearings.

An additional object of my invention is to provide in an instrument of the type described, a closed bearing for the telescope barrel in order to facilitate adjustment of the telescope to center the telescope cross wires.

Another object is to avoid such weakening of the shell of the spirit level as is caused when the shell must be provided with openings on opposite sides in order that the spirit level may be read in reversed position as is required in convertible instruments previously used. In my instrument I avoid the necessity of reversing the spirit level at any time.

Another important object of my invention is the provision of permanent bearings for the spirit level and the telescope irrespective of how frequently the use of the instrument varies from use as a transit to use as a level.

Another object of my invention is to provide a compass which will rotate automatically with the telescope and spirit level as they are shifted from position in which the instrument is used as a level to position in which it is used as a transit.

These and various other detailed objects of my invention are attained in the structure illustrated in the accompanying drawings and described below. In these drawings—

Figure 1 is a side elevation of my improved instrument when in position to be used as a level.

Figure 2 is an elevation looking at the lower part of the instrument in a direction at right angles to that illustrated in Figure 1, the upper part of the instrument being swung horizontally ninety degrees from the position shown in Figure 1 and tilted vertically as indicated; the instrument in this view being adapted for use as a transit.

Figure 3 is a vertical longitudinal section through the center portion of the cross bar of the instrument, and through the table on which it is mounted, the compass, and the standard which carries the telescope.

Figure 4 is a vertical section taken on line 4—4 of Figure 1.

Figure 5 is a longitudinal vertical section through the right hand end of the cross bar and parts carried thereby.

Figures 6 and 7 are vertical sections taken on lines 6—6 and 7—7, respectively, of Figure 4.

Figure 8 is a horizontal section taken on line 8—8 of Figure 3.

Figure 9 is a detail section through parts shown in Figure 3 but taken at right angles thereto.

Figure 10 is a section through the trivet plate forming the mounting for the instrument.

The base of my instrument is preferably formed by a trivet plate 1, the same being adapted to be screwed onto the upper end of a tripod in the usual manner, but being provided with three integral pointed lugs 1ª for mounting the instrument on a table, window-sill, or other elevated surface which eliminates the necessity for using the tripod. The base provides the usual socket bearing 2 for the head 3 of the instrument and the latter is equipped with the usual thumb screws 4 for leveling the head 3. The usual vertical shaft S (Fig. 3) is journaled in the center of head 3 and mounts the instrument table 5 which has the cross bar 6 supported thereon by spaced legs 6ª.

The cross bar journals a vertical rotatable standard 7, the axis of which is accurately aligned with the axis of the vertical shaft on which table 5 is mounted. A set screw 29 in cross bar 6 projects into a peripheral groove 30 in standard 7 and holds the shaft and standard in assembled position. A thumb screw 60 in shaft S is used to clamp the standard 7 in any desired angular position relative to shaft S. Standard 7 is provided with integral brackets 8 in which the telescope 9 is journaled.

A compass box 10 is rotatably mounted in cross bar 6 and preferably is fixed to the lower end of standard 7 (Fig. 3) by screws 27. Obviously, whenever the telescope is rotated in a horizontal plane, the compass box rotates with it and the user is able to keep the south point of the compass beneath the eyepiece, and computations to determine the direction of the sighting of the transit are reduced accordingly.

Elimination of screws 27 will permit disassembly of standard 7, mounting the telescope, and the compass. Irrespective of screws 27 adjustment of the graduated plate and ring of the compass and the collimination line of the telescope are effected by use of the screw 66 which is threaded into one of several holes 67 in the compass ring 68 and clamps the same against the compass box 10.

Each outer end of cross bar 6 is threaded to receive a lower bearing screw 11, which, after adjustment, may be locked in position by the set screw 12 (Fig. 5). The head of screw 11 supports an extensible member forming one of the elements which corresponds to the wye in general use. This member comprises elements 13 and 14 screwed together and adapted to be held in assembled position by the set screw 15.

Element 14 includes a ring 16 adapted to receive the barrel of the telescope 9 and the telescope is rotatably fitted in ring 16, a suitable lining 17 being provided for this purpose. The telescope may be held against rotation in ring 16 by clamp 18 which is tightened by nut 19 threaded on the shank of member 14.

The spirit level 20 of the instrument is preferably mounted on the telescope supporting member, the end 21 of the level surrounding element 13 and being adjustable vertically thereon by the level adjusting nut 22. Nut 23 serves to clamp the level in adjusted position. It will be understood that the opposite end of the level does not need to be adjusted and only requires clamping nuts 22ª and 23ª.

Each element 13 and all of the parts carried thereby are detachably held over cross bar 6 by means of a holding pin 24 slidable in leveling screw 11 but provided with a recessed head 25 on its upper end and with a thumb screw 26 on its lower end, whereby it may be quickly screwed into element 13 or unscrewed therefrom.

It will be seen that the above described structure provides a two-part support for each end of the telescope which parts may be instantly detached from each other to permit the telescope, and the level associated therewith, to rotate horizontally with standard 7 from the position shown in Figure 1 to the position shown in Figure 2, in which latter position the telescope and level may be tilted vertically so as to be used as a transit. When it is desired to use the instrument 7 as a level the telescope is turned to a horizontal position and then rotated horizontally to bring elements 13 over their respective elements 11 after which these parts may be held together by pins 24.

It is desirable that after the telescope is released from cross bar 6 and swung to a transit-functioning position, it can only be returned to a level-functioning position by moving its ends over the same respective bearings on which they previously rested. This object is attained by providing the upper face of cross bar 6 with set screws 31 (Figs. 4 and 8) which project into an annular groove 61 in the downwardly facing shoulder provided near the lower end of standard 7. A horizontal set screw 62 positioned radially in standard 7 cooperates with screws 31 to limit the rotation of the telescope and level to ninety degrees. By removing screw 62 the parts mounted on shaft 7 may be rotated one hundred eighty degrees as is necessary when the instrument is to be adjusted to correct any errors which may be caused by blows or other forces tending to disturb the original adjustment.

Referring now to the central mounting of the telescope in brackets 8 (Fig. 4) I direct attention to the sleeve 32 which surrounds the telescope and is provided with integral transverse trunnions 35 which are journaled in suitable bushings 36 seated in brackets 8. Each of these brackets 8 is rigid with the standard 7 and with each other, thereby avoiding the unsatisfactory operating conditions which arise from the use of movable brackets such as have been used heretofore in so-called convertible instruments of this type.

The bushing 36 in one of the brackets 8 is pivotally mounted (Fig. 7) by two laterally disposed pointed set screws 37 and the bushing 36 in the other bracket 8 may be adjusted vertically and transversely of its axis by flat end set screws 38 and may be secured in adjusted position by the pointed set screw 39.

Each trunnion 35 detachably mounts apparatus for aiding accurate use of the instrument as a transit. On the right hand trunnion 35 I mount an arc member 40, the same being clamped to the trunnion by a screw 41. A cooperating arc element 42 (Fig. 2) is carried on the end of an arm 43 which is rigid with bracket 8. It will be understood that the adjacent faces of these arc elements are provided with suitable scale markings and cooperate in the usual manner. An extension hub 44 is secured to the opposite trunnion 35 by means of a screw 45 and this hub 44 carries a split clamp arm 46 rotatably retained on the hub by screw 52. The lower end of arm 46 is bifurcated (Fig. 1) to mount at one side a barrel 47 containing a spring-pressed plunger 48 which engages one side of a lug 49 integral with bracket 8. The other side of the bifurcation mounts the micrometer adjusting screw 50, the end of which engages the opposite side of lug 49. By means of screw 50 accurate vertical rotation of the telescope is provided. When the telescope is finally placed at the desired vertical angle it may be clamped by tightening screw 51 which may be loosened when it is desired to adjust the vertical angle of the telescope.

The distance from the outer end of one trunnion 35 to the inner end of the opposite trunnion, adjacent the periphery of sleeve 32, is less than the distance between the inner faces of brackets 8, and this permits the sleeve 32 and telescope to be removed from the brackets when screws 41 and 52 and 45 are removed.

While the novel features of my instrument are described above, it is to be noted that the instrument includes a number of additional elements which have been previously used in instruments of this type. For instance, the telescope eye-glass may be adjusted by rotation of screw 53 to focus the cross wires and the focal length of the telescope may be adjusted by means of the screw 54. The cross wires may be shifted vertically and transversely and rotated axially of the telescope by manipulation of screws 55 and by rotation of the latter about the barrel of the telescope.

Micrometer adjustment of the table 5 is provided by the bar 56 which can be clamped to the head 3 by means of screw 57 and the outer end of this bar is bifurcated and carries a micrometer adjusting nut 58 and cooperating spring-pressed plunger similar to the parts 47, 48, and 50 on bar 46 mounted on the telescope trunnion. The adjusting element on bar 56 engages a lug 34 on table 5 and enables the user to adjust the table about its axis.

The compass is provided with a needle locking screw 59 and the compass is also provided with the usual mechanism for adjusting the points of the compass to accommodate the departure of the magnetic north from the true north.

With my instrument set up as a level as illustrated in Figure 1, the user may center the cross wires and bring the spirit level parallel with the collimating line and may level the cross bar and the telescope bearings on the cross bar, by screws 4, and may level the telescope transversely of the collimating line with screws 38, and may square the cross wires with screws 55. In other words, the instrument may be tested and adjusted in every way necessary for its use as a level.

To convert the instrument into a transit, the user merely rotates the heads 26 of pins 24 a turn or two, permitting them to drop from the position illustrated until the shouldered upper end of each (Fig. 5) rests on screw 65, in which position the threaded upper ends 25 of pins 24 do not engage the lower element 13 of the telescope support, and the shaft 7 and brackets 8, with the telescope and spirit level and other parts mounted thereon, may be rotated as a unit in a horizontal plane to any desired angle, and the telescope may be tilted in a vertical plane and the instrument used as a transit.

When the instrument is again to be used as a level, the telescope is righted and moved back to its original position, with its members 13 aligned with the cross arm bearing screws 11, and pins 24 raised and screwed into members 13.

The telescope barrel is never removed from its bearings during the conversion of the instrument, nor is the telescope disassembled from the spirit level. The adjustment of the cross wires is undisturbed throughout conversion of the instrument. There is no opportunity for the telescope barrel to be reversed in its bearings or for the end bearing elements on the telescope to be reversed upon the cross arm.

These and many other detailed advantages will be apparent to the experienced user of surveying instruments, and I contemplate the exclusive use of structure corresponding to that illustrated and included in the scope of my claims.

Obviously, in a complicated instrument of this type there is room for infinite variations in the details and in the particular mechanisms for accomplishing similar ends, and I do not intend by the foregoing description to limit the statements of my invention to the particular structural features illustrated and described.

I claim:

1. In a surveying instrument, a cross bar, individual two-part bearings for a telescope mounted on each end of said cross bar, the parts of said bearings being separable by relative horizontal movement.

2. In a surveying instrument, a telescope mounting comprising a vertically extensible support, a closed ring on said support for receiving the telescope barrel, and means for clamping the telescope against the inner face of said ring irrespective of the angular position of the telescope in said ring.

3. In a surveying instrument, a cross bar, a vertically adjustable bearing element on each end of said cross bar, an individual vertically extensible cooperating bearing member resting upon each of said elements respectively and a telescope mounted on said members.

4. In a surveying instrument, a cross bar, a vertically adjustable bearing element on each end of said cross bar, an individual vertically extensible cooperating bearing member resting upon each of said elements respectively, and a telescope and a spirit level mounted on said members.

5. In a surveying instrument, a cross bar, a vertically adjustable bearing element on each end of said cross bar, a vertically extensible cooperating bearing member resting upon each of said elements respectively, and a telescope and a spirit level mounted on said members, said telescope and spirit level being adjustable vertically independently of each other on said members.

6. In a surveying instrument, rigid brackets having aligned horizontal openings, bushings slidable in said openings, a telescope having lateral trunnions detachably fitting in said bushings, the distance from the inner end of one of said trunnions to the outer end of the other of said trunnions being less than the distance between the inner faces of said brackets, and elements detachably secured to said trunnions and engaging the outer faces of said brackets, whereby upon removal of said elements said telescope may be moved transversely of said brackets so as to permit disengagement of said trunnions and bushings and removal of said telescope from the brackets.

7. In a surveying instrument convertible from a transit to a level and vice versa, a telescope mounting member, a telescope that is tiltable vertically and rotatable horizontally without removal from said member, and cooperating elevation arc elements mounted on said telescope and member respectively, their assembly being maintained when the instrument is used as a level.

8. In a surveying instrument, a rotating vertical shaft, a table mounted on said shaft, a cross bar mounted on said table, a vertical standard rotatably mounted on said cross bar in axial alignment with said shaft, a telescope mounted on said standard, and cooperating elements on said cross bar and telescope for holding said telescope in a horizontal position when said telescope is over said cross bar.

9. In a surveying instrument, a rotating vertical shaft, a table mounted on said shaft, a cross bar mounted on said table, a vertical standard rotatably mounted on said cross bar in axial alignment with said shaft, a telescope mounted on said standard, and cooperating elements on said cross bar and telescope for holding said telescope at any desired relation to the horizontal and means for holding said telescope at any desired relation to the points of the compass.

10. In a surveying instrument, a base, a table mounted to rotate on said base, a telescope-carrying cross bar supported thereon by spaced elements, and a compass box rotatably mounted on said table between said elements.

11. In a surveying instrument, a table, a cross bar mounted thereon having spaced telescope supports, another telescope mounting member on said cross bar between said supports rotatable horizontally independently of said supports, a compass rotatably mounted on said table and axially aligned with the axis of rotation of said member, and means for causing said compass to rotate with said member.

12. In a surveying instrument, a table, a cross bar having spaced telescope supports, another telescope mounting member on said cross bar rotatable horizontally independently of said supports, a compass rotatably mounted on said table, means for causing said compass to rotate with said telescope, and means for positively holding said telescope and compass in fixed relation to said table.

13. In a surveying instrument, a cross bar, a central vertical rotatable shaft extending above said cross bar, a telescope carried on said shaft and rotatable horizontally therewith independently of said cross bar, and spaced telescope supports on said cross bar with their upper ends below the level of the barrel of said telescope, when the latter is horizontally disposed on said shaft, whereby the telescope may be swung over said supports without removal from said shaft.

14. In a surveying instrument, a telescope, lateral trunnions on said telescope, individual bearings for said trunnions, a horizontally rotatable member having brackets for supporting said bearings, opposed horizontal pointed set screws in one of said brackets for mounting one of said bearings and three or more adjusting screws spaced about the inner face of the other of said brackets for mounting the other of said bearings.

15. In a surveying instrument convertible from a transit to a level and vice versa and comprising permanently assembled parts including a cross bar, a telescope, telescope supporting elements on said cross bar spaced longitudinally of said telescope, a standard rotatably mounted on said cross bar and having brackets at the sides of said telescope, telescope trunnions permanently journaled on said brackets and cooperating elevation-determining elements on said standard and telescope.

16. In a surveying instrument, a table, a telescope, a cross bar on said table having telescope supports spaced longitudinally of said telescope, means for rotating said telescope horizontally on said cross bar independently of said supports, and a compass box mounted on said table to rotate with said telescope, said box including a graduated reading member adjustable angularly relative to said box.

17. In a surveying instrument, a telescope, a cross bar having spaced supports for opposite ends of said telescope when the latter is in a certain position relative to said cross bar, other mounting means permanently mounted on said cross bar and permanently assembled with said telescope, said means being rotatable in a horizontal plane from said position, and releasable means for holding said telescope in engagement with said supports.

18. In a surveying instrument, a telescope, a cross bar having spaced supports for opposite ends of said telescope when the latter is in a certain position relative to said cross bar, and other mounting means permanently mounted on said cross bar and permanently assembled with said telescope so that the latter may tilt in a vertical plane, when in another position relative to said bar, said means being rotatable in a horizontal plane without detachment from said cross bar.

19. In a surveying instrument, a cross bar, a telescope, means supporting said telescope on said cross bar so that said telescope may swing in a horizontal plane, or in a vertical plane, or may rotate on its optical axis, a level, and elements for mounting said level so that it swings with said telescope horizontally and vertically but does not rotate with said telescope when the latter is rotated on its axis.

20. In a combined level and transit, a telescope, means for positioning said telescope with its axis disposed horizontally, a member rotatable relative to said means, in a horizontal plane, trunnions on said telescope whereby it may be tilted in a vertical plane, and elements permanently and adjustably mounting said trunnions in said member.

21. In a surveying instrument, a cross bar, telescope supports spaced longitudinally thereof, a horizontally rotatable standard between said supports, a telescope mounted on said standard so as to tilt in a vertical plane and adapted to be engaged by said support so as to be held in a horizontal plane when over the same, and a compass box secured to said standard and rotatable therewith.

In testimony whereof I hereunto affix my signature this 3rd day of December, 1926.

FRANK MIHÁLYI.